United States Patent [19]

Yoshimura

[11] Patent Number: 4,574,315

[45] Date of Patent: Mar. 4, 1986

[54] CIRCUIT FOR DRIVING DISPLAY APPARATUS

[75] Inventor: Masahiro Yoshimura, Nara, Japan

[73] Assignee: Sharp Kabushiki Kaisha, Osaka, Japan

[21] Appl. No.: 530,472

[22] Filed: Sep. 8, 1983

[30] Foreign Application Priority Data

May 11, 1983 [JP] Japan ................................ 58-82922

[51] Int. Cl.[4] ................................ H04N 5/66

[52] U.S. Cl. ................................ 358/241; 315/169.3

[58] Field of Search ................................ 358/240, 241; 315/169.1, 169.2, 169.3; 357/24

[56] References Cited

U.S. PATENT DOCUMENTS 4,110,662 8/1978 Greeneich ................................ 358/241

*Primary Examiner*—Tommy P. Chin
*Attorney, Agent, or Firm*—Staas & Halsey

[57] ABSTRACT

A display circuit for a matrix display includes a plurality of picture elements comprising display elements driven by drive circuits. A data regenerative circuit determines whether an external video signal is to be displayed or whether the image being displayed by the picture elements is to be held. When the image currently stored in the picture elements is to be held, the data regenerative circuit reads the stored image data from a selected picture element, regenerates the level of the data signal and causes this data to be rewritten into the selected picture element.

11 Claims, 4 Drawing Figures

CIRCUIT FOR DRIVING DISPLAY APPARATUS

BACKGROUND OF THE INVENTION

This invention relates to a display apparatus, and more particularly to a display circuit including drive circuits for display apparatus in which active elements are provided to drive the display elements of respective picture elements. The active elements are operated to display a variety of data.

A display apparatus has been developed having drive circuits formed on a substrate, in a matrix, for displaying picture elements. The drive circuits are actuated by scanning signals, so that data is displayed with LED's, LCD's EL's or fluorescent display tubes arranged in matrix form. In a display apparatus of this type, when the display elements cannot store data by themselves and it is required to display one of the images input by a time-series signal (such as a composite video television signal), as a still image on the screen formed by the displaying elements arranged in matrix form, it is necessary to temporarily store signals, corresponding to the image, in memory and to supply the stored signals to the display elements when required.

Thus, in order to display a still image, it is necessary to use display elements and a memory having a capacity corresponding to the number of picture elements.

This results in an uneconomical display apparatus having an increased number of components.

On the other hand, the drive circuit shown in FIG. 1 has been proposed for use in a two-dimensional image display apparatus having drive circuits for respective picture elements. The drive circuit is for a single picture element and includes an active element for holding data for a short period of time. A writing transistor 2 is rendered conductive (on) by a signal applied to a scanning signal line 1, so that a voltage on a video signal line 3 is temporarily held by a capacitor 4. The voltage held by the capacitor 4 is applied to the gate of a display element driving transistor 6, to set the voltage of its drain electrode 7, thereby operating a display element 8 comprising an LCD, LED, EL, fluorescent display tube or the like.

The above-described drive circuits, the number of which corresponds to the number of picture elements, are integrally formed on an insulated substrate by a film technique or by utilizing a semiconductor substrate. In order for the display apparatus to display two-dimensional data, each of the drive circuit which are formed for the picture elements must operate satisfactorily. Accordingly, if it can be determined whether or not the drive circuits operate satisfactorily before the drive circuits are connected to the display elements, then display apparatuses can be manufactured with a high yield and high efficiency, because only the operative substrates will be selected and connected to the display elements. However, in order to test the drive circuit shown in FIG. 1, it is necessary that the components of the drive circuit be assembled and that the drive circuit be connected to the display element.

In order to overcome this difficulty, Japanese Patent Application Laid-Open No. 99688/1982 provides for a drive circuit which can be inspected without connection to its display element. As shown in FIG. 2, a reading transistor 9 is connected between the video signal line 3 and the driving transistor 6. Accordingly, the drain voltage of the driving transistor 6 can be applied to the signal line 3 if a signal 10 is applied to the gate of the reading transistor 9, so that the drive circuit can be inspected without being connected to the display element 8. However, the drive circuit of FIG. 2 is disadvantageous in that, in order to provide a matrix-shaped image display, it is necessary to provide a separate memory for holding data.

SUMMARY OF THE INVENTION

It is a primary object of this invention to eliminate the above-described drawbacks of conventional display apparatus.

It is an object of this invention to provide a display circuit which is capable of holding a desired image, without requiring a separate memory device.

In particular, it is an object of the present invention to provide a display circuit for a display apparatus, which is capable of reading data stored as driving voltages for display elements, including a simple data regenerative circuit for disconnecting the drive circuits of the picture elements from an external signal, reading out the data stored in the drive circuits, and rewriting the data into the drive circuits after adjusting the level of the driving voltages, thereby holding a desired image.

These together with other objects and advantages, which will become subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENT

The invention will be described with reference to the case where a binary image is displayed as a two-dimensional image by a point-sequential scanning system.

Figure 1:
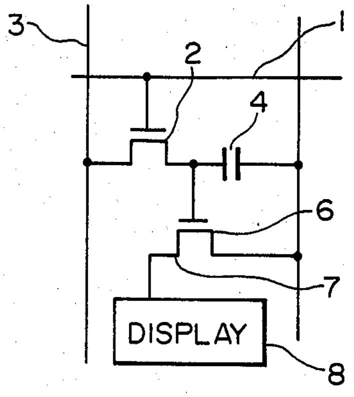
FIG. 1 PRIOR ART
FIG. 1 is a circuit diagram of a first example of a conventional drive circuit for a display element.
Figure 2:
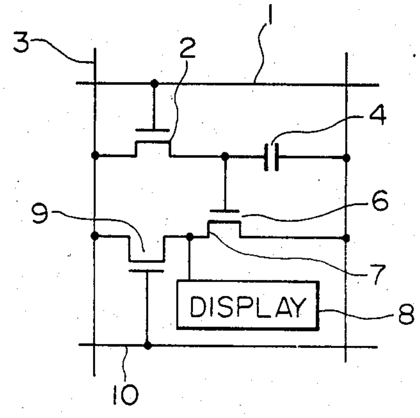
FIG. 2 PRIOR ART
FIG. 2 is a circuit diagram of a second example of a conventional drive circuit for a display element.
Figure 4:
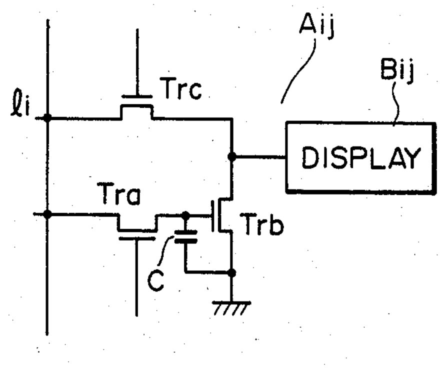
FIG. 4 is a circuit diagram of the display element drive circuit used in the circuit of FIG. 3.
Figure 3:
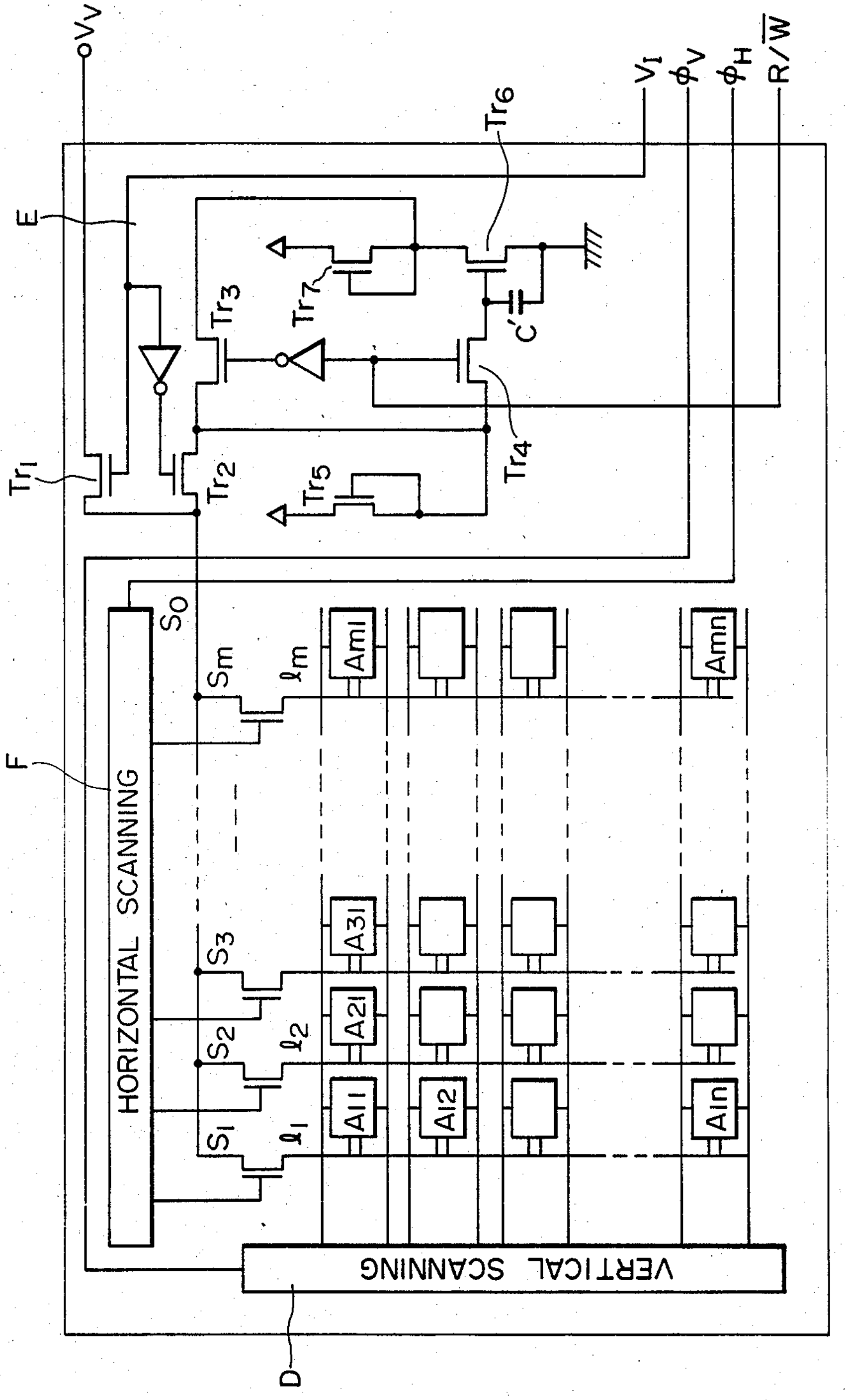
FIG. 3 is a circuit diagram of an embodiment of the present invention.

FIG. 3 is a block diagram of a display circuit for a display apparatus having picture elements, including drive circuits, arranged in the form of a matrix. Drive circuits $A_{11}$, $A_{12}$, . . . and $A_{mn}$ for respective picture elements are provided by forming film transistors on the same substrate or by using a semiconductor substrate. In each drive circuit $A_{ij}$, as shown in FIG. 4, a writing transistor $Tr_a$ and a reading transistor $Tr_c$ are commonly connected to a signal line $l_i$, and a driving transistor $Tr_b$ has a gate for receiving a signal passed through the writing transistor $Tr_a$. A signal at the node connecting one terminal of the driving transistor $Tr_b$ and the reading transistor $Tr_c$, is applied to a display element $B_{ij}$. In FIG. 4, a capacitor C, corresponding to the MOS gate capacitance of the driving transistor $Tr_b$ in the drive circuit, operates to temporarily hold written data.

In each column of the display, the signal line $l_i$ is connected to the respective drive circuits. The signal line $l_1$ through $l_m$ are connected through scanning switching transistors $S_1$ through $S_m$, respectively, to a video signal input terminal $S_0$. The input terminal $S_0$ serves not only as a terminal for supplying a video signal Vv to the picture elements, but also as a terminal for transmitting data between the driven circuits and a regenerative circuit E which is described below.

A horizontal scanning circuit F applied a horizontal scanning signal to the gates of the above-described scanning switching transistors $S_1$ through $S_m$ to control the horizontal scanning of the picture elements. The vertical scanning of the picture elements is carried out when a vertical scanning circuit D applies a writing signal or a reading signal to the gate of the writing transistor $Tr_a$ or the gate of the reading transistor $Tr_c$, respectively, in each of the drive circuits in each row. That is, the horizontal scanning circuit F and the vertical scanning circuit D select a drive circuit $A_{ij}$ to which the video signal Vv is to be inputted, so that the display element driving transistor $Tr_b$ is turned on or off through the writing transistor $Tr_a$ in the drive circuit corresponding to the picture element, to drive the display element $B_{ij}$.

Next, the regenerative circuit E for holding images will be described. The input terminal $S_0$, to which the scanning switching transistors $S_1$ through $S_m$ are connected, is connected to a first switching element which is adapted to determine whether the display elements display an image based on an externally applied video signal or a still image based on data already written in the picture elements. The first switching element comprises a MOS transistor $Tr_1$ having a terminal which acts as an external video signal input terminal, and a MOS transistor $Tr_2$. The first switching element determines whether the external video signal is received or disconnected so as to hold the stored image, in dependence upon input switching signals $V_I$ and $\overline{V}_I$ applied to the gates of the transistors $Tr_1$ and $Tr_2$, respectively. The MOS transistor $Tr_2$ is connected to a second switching element for switching between an image signal reading operation and an image signal writing operation in the regenerative circuit E. The second switching element comprises MOS transistors $Tr_3$ and $Tr_4$, to the gates of which write and read switching signals $R/\overline{W}$ and $\overline{R/\overline{W}}$ are applied to control the writing and reading operations of the regenerative circuit E. The node connecting the MOS transistors $Tr_2$ and $Tr_4$ is also connected to a MOS transistor $Tr_5$ which is used for pull-up during image signal reading. The MOS transistor $Tr_4$ of the second switching element, is connected to the gate of a MOS transistor $Tr_6$ which, together with a MOS transistor $Tr_7$, formed an inverter. The node connecting the MOS transistor $Tr_6$ and $Tr_7$ is connected to a terminal of the MOS transistor $Tr_3$. Thus, a signal reading path from the regenerative circuit E is formed.

In the above-described circuitry when it is required to maintain a display of an image currently being displayed on the basis of the external video signal Vv, the input switching signal $V_I$ is used to render the MOS transistor $Tr_1$ non-conductive, thereby disconnecting the external video signal Vv, and to render the MOS transistor $Tr_2$ conductive, thereby electrically connecting the video signal input terminal $S_0$ to the side of the inverter for data correction. For all the picture elements, the drive circuits and the regenerative circuit E carry out the following two operations in succession during a period defined by the time in which the signal stored in the capacitor C of each display element (the gate oxide film capacitance of the MOS transistor $Tr_b$) is dissipated, for instance, through leakage.

(1) The signal level of the picture element at the i-th row and j-th column is read via the transistors $Tr_c$, $Tr_2$ and $Tr_4$ and is stored, as the inverted display signal, in the capacitor C′ in the regenerative circuit E.

(2) In the regenerative circuit E, the transistors $Tr_4$ and $Tr_3$ are rendered respectively non-conductive and conductive, the signal in the capacitor C′ is inverted by the inverter comprising the transistors $Tr_6$ and $Tr_7$, and is then input through the transistors $Tr_3$, $Tr_2$ and the writing transistors $Tr_a$ of the display element, into the drive circuit.

The operations (1) and (2) described above are repeatedly carried out to hold the image.

When it is required to suspend the image holding operation to display an externally input image again, the input switching signal $V_I$ is used to change the state of the first switching element, i.e., to render the transistors $Tr_1$ and $Tr_2$ conductive and non-conductive, respectively. As a result, the external video signal Vv is applied to the drive circuits, so that the latter write the external video signal to display the image.

In the above-described embodiment, binary data is displayed. However, if the inverter for data correction in the regenerative circuit E is made up of a circuit which corrects and outputs the input signal, a gradation image also can be displayed.

In addition, if the regenerative circuit E is formed on the same substrate as the drive circuits, then the invention can be realized without increasing the number of manufacturing steps and the number of components.

As is apparent from the above description, according to the invention, the image can be held on the display surface merely by connecting a simple circuit and without requiring a separate memory device. Thus, the function of the displaying apparatus has been improved, and the range of application is considerably increased.

The many features and advantages of the invention are apparent from the detailed specification, and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation shown and described and, accordingly, all suitable modifications and equivalents may be resorted to, falling within the scope of the invention.

What is claimed is:

1. A display circuit connected to receive a video signal, comprising:
   - a plurality of picture elements for displaying an image, each of said plurality of picture elements including:
     - a display element; and
     - a drive circuit, operatively connected to said display element, for driving said display element based on a drive voltage corresponding to the video signal, said drive circuit including a data holding element, a data writing element for writing the drive voltage corresponding to the video signal into said data holding element, and a data reading element for reading the drive voltage from said data holding element; and
   - a data regenerative circuit, operatively connected to said drive circuit of each of said picture elements, for receiving the drive voltages read from said respective drive circuits of said picture elements, for regenerating the drive voltages, and for providing the regenerated drive voltages for rewriting in said respective drive circuits by said data writing element.

2. A display circuit as set forth in claim 1, wherein said data regenerative circuit comprises:

a first switching element, connected to receive the video signal and connected to said plurality of picture elements, for providing one of the video signal and the regenerated drive voltage to said plurality of picture elements;

a second switching element, operatively connected to said first switching element, for switching said data regenerative circuit between a read operation and a write operation; and a correcting circuit, operatively connected to said second switching element, for adjusting the level of the drive voltage received during the read operation and for applying the adjusted drive voltage, as the regenerated drive voltage, to said drive circuit.

3. A display circuit connected to receive a video signal and an input switching signal, comprising:

picture elements, arranged in a matrix, for displaying an image, each of said picture elements including:

means for holding an image data signal level;

means for writing image data corresponding to the image data signal level into said holding means; and means for reading the image data signal from said holding means;

scanning means, operatively connected to said picture elements, for selecting one of said picture elements for a reading or writing operation;

a data regenerative circuit, operatively connected to said picture elements at a first node and operatively connected to receive the video signal and the input switching signal, said data regenerative circuit regenerating the image data signal read from the selected one of said picture elements, and providing one of the video signal and a regenerated image data signal at the first node in dependence upon the input switching signal.

4. A display circuit as set forth in claim 3, wherein said data regenerative circuit comprises:

a first switching element, operatively connected to receive the video signal and the input switching signal and operatively connected to the first node;

first means, operatively connected to said first switching element at a second node, for receiving the image data signal from the selected one of the picture elements; and second means, operatively connected to said first means, for receiving and regenerating the image data signal and for providing the regenerated image data signal to said first means, said first means providing the regenerated image data signal to the selected one of the picture elements through said first switching element.

5. A display circuit as set forth in claim 4, wherein said first means comprises a second switching element connected to said first switching element at the second node and wherein said second means comprises a capacitor connected to said second switching element, and an inverter circuit connected between said capacitor and said second switching element.

6. A display circuit connected to receive a video signal and an input switching signal, comprising:

picture elements for displaying an image, for holding image data, and for reading and writing the image data;

first means, operatively connected to said picture elements, for scanning said picture elements to select one of said picture elements for a read operation or a write operation;

second means, operatively connected to said picture elements at a first node, operatively connected to receive the video signal and operatively connected to receive the input switching signal, for providing the video signal for writing into the selected one of the picture elements, or for regenerating the image data stored in the selected one of said picture elements to hold the image, in dependence upon the input switching signal.

7. A display circuit as set forth in claim 6, wherein said second means comprises:

third means for receiving and regenerating image data read from the selected one of said picture elements; and fourth means, operatively connected at the first node, operatively connected to receive the video signal and the input switching signal and operatively connected to said third means, for connecting one of the video signal and said third means to said first node in dependence upon the input switching signal.

8. A display circuit as set forth in claim 7, wherein said display circuit is operatively connected to receive a read/write signal, wherein said fourth means comprises a first switching element and wherein said third means comprises:

a second switching element operatively connected to said first switching element; and an image data regeneration circuit, operatively connected to said second switching element and operatively connected to receive the read/write signal, for receiving image data and for providing regenerated image data, wherein said second switching element transfers the image data from the selected one of said picture elements into said image data regeneration circuit via said first switching element and wherein said second switching element transfers the regenerated image data from said image data regeneration circuit back to the selected one of said picture elements, via said first switching element, in dependence upon the read/write signal.

9. A display circuit as set forth in claim 8, wherein each of said picture elements is operatively connected to the first node and wherein each of said picture elements comprises:

a display element;

a read transistor having a first terminal operatively connected to said display element and having a second terminal operatively connected to said first node;

a drive transistor having a first terminal operatively connected to said display element and having second and third terminals;

a write transistor having a first terminal connected to the third terminal of said drive transistor and having a second terminal operatively connected to said first node; and a capacitance, operatively connected to the second and third terminals of said drive transistor, for holding the image data.

10. A display circuit as set forth in claim 9, wherein said read transistor, said write transistor and said drive transistor each comprise a MOS transistor, and wherein said capacitance comprises the MOS gate capacitance of said drive transistor.

11. A display circuit as set forth in claim 10, wherein said display element comprises one of the group consisting of a liquid crystal display element, a light emitting diode, an electroluminescent display element and a fluorescent display tube.

* * * * *